Figure 1:
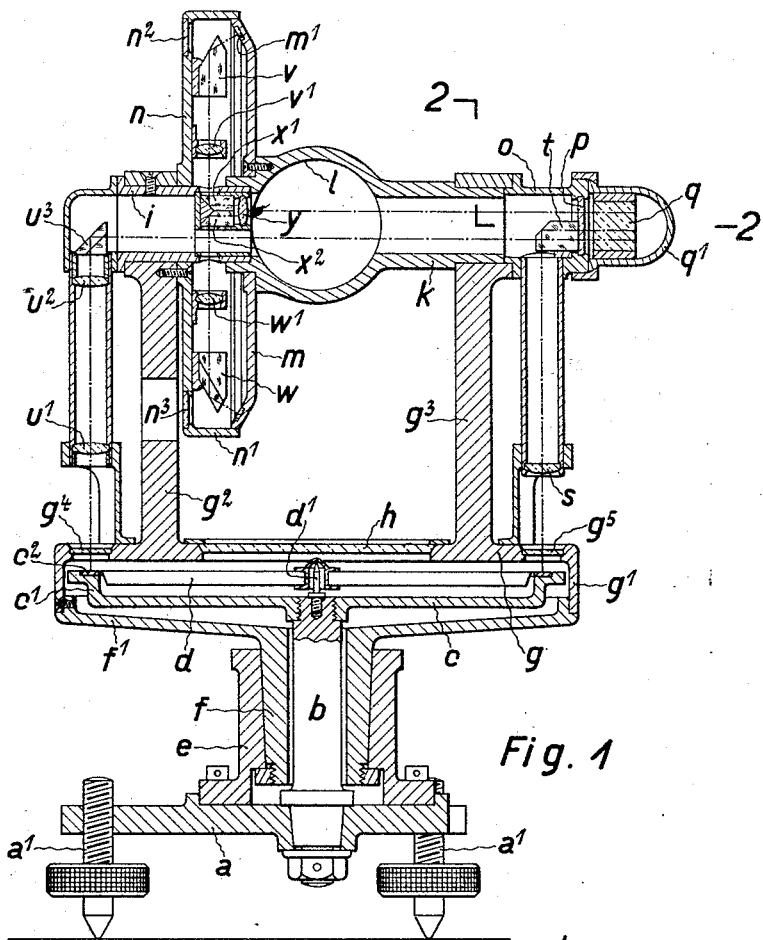

June 16, 1925.                                              1,542,397
A. KÖNIG
THEODOLITE WITH COMPASS
Filed April 20, 1923

Inventor:
Albert König

Patented June 16, 1925.

1,542,397

UNITED STATES PATENT OFFICE.

ALBERT KÖNIG, OF JENA, GERMANY, ASSIGNOR TO THE FIRM CARL ZEISS, OF JENA, GERMANY.

THEODOLITE WITH COMPASS.

Application filed April 20, 1923. Serial No. 633,474.

*To all whom it may concern:*

Be it known that I, ALBERT KÖNIG, a citizen of Germany, and residing at Jena, Germany, have invented a new and useful Theodolite with Compass (for which I have filed an application in Germany, May 4, 1922), of which the following is a specification.

The present invention relates to theodolites in which in the field of view of a reading microscope the horizontal pitch circle can be read off and which are fitted with a compass. In theodolites the compass has hitherto been fixed as a saddle compass above the tilting axis or adapted below the telescope between the bearings of the tilting axis. In either case the reading of the position of the magnetic needle is more or less inconvenient, in the one case owing to the high position of the compass, in the other case on account of the telescope located above; besides, the observer is bound to change each time his station or alter at least the attitude of his head. According to the present invention the compass is united with the horizontal pitch circle, i. e. the magnetic needle is so disposed inside this circle that, on the telescope being approximately adjusted to the magnetic meridian, simultaneously with the pitch circle the magnetic needle is also visible in the ocular field. With a view to rendering harmless any errors of eccentricity, the theodolite may be so constructed that two opposite places of the pitch circle and also both ends of the magnetic needle are simultaneously visible.

In theodolites, having one of the usual compass arrangements, the compass is always provided with a circle division of its own on which the position of the needle is read off. In a theodolite according to the present invention this second division may be entirely dispensed with by providing a fixed reading mark (if both needle-ends be visible, one mark for each) in the ocular field so as to be able to read off on the horizontal pitch circle the position of the telescope corresponding to the magnetic meridian. For this purpose it is possible, unless it be desired to adapt a special mark, e. g. in a theodolite fitted with a graduated microscope, to impart to the zero line of the graduation such a length as to bring this line itself into coincidence with the ends of the magnetic needle. Hence when measuring an angle by means of the compass after having directed the telescope upon the sighting point, instead of reading off in the former way the angle on the compass circle, with the new arrangement two readings are taken on the horizontal pitch circle, the one time when directing the telescope upon the magnetic meridian, the other time when directing the instrument upon the magnetic meridian, by bringing the magnetic needle into coincidence with the respective mark in the ocular field. In a theodolite of the repeating type the measuring process can, naturally, be substantially simplified by adjusting from the outset the zero point of the horizontal pitch circle on the magnetic meridian. If the magnetic needle shows an error of eccentricity, i. e. if the two needle ends do not simultaneously coincide with the appertaining reading marks, it is, as may be easily seen, requisite to either read off both needle-ends separately and to form the mean or (if both needle-ends be simultaneously visible to bring for the reading the two needle ends into a symmetrical position relatively to the reading marks.

A particularly suitable arrangement for using the theodolite is attained by simultaneously rendering possible in the field of view of the same reading microscope the reading of the height circle. With a view to attaining thereby the same accuracy of measuring as with the horizontal pitch circle, it is possible to also image simultaneously two opposite places of the circle division so as to be able to read off again both places of the circle by means of the same reading device.

Figures 2, 3:
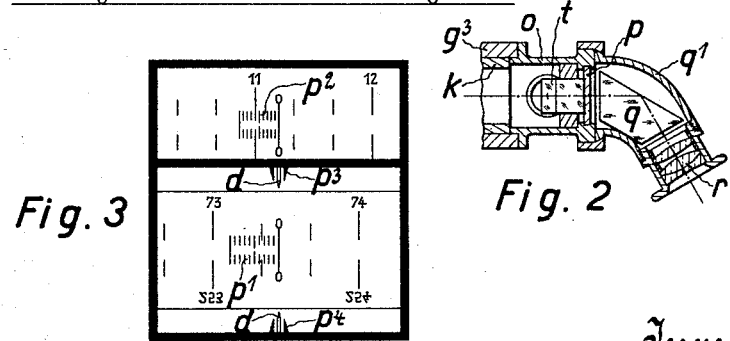

In the annexed drawing the invention is shown by a constructional example. Fig. 1 is a vertical section of the entire instrument, Fig. 2 shows a horizontal section on the line 2—2 of Fig. 1 of the reading ocular, Fig. 3 represents the field of view of the reading ocular after the telescope has been directed upon the magnetic meridian. The example represents a theodolite of the usual type, having a centric, straight telescope with the parts substantial for the invention, whereby, for clearness sake, generally customary details, e. g. clamping and fine movement for the two circles water levels, adjusting means and so forth, which are supposed to be known, have been dispensed with. A base plate *a*, fitted as usual with three adjusting screws $a^1$, carries in its middle a cylindrical pillar $b$ which is rigidly connected to this place and at the top end of which pillar there is fixed a horizontal disc $c$. The latter has an upwardly cranked margin $c^1$ into which a ring $c^2$ is inserted. The latter is the carrier of the horizontal pitch circle; the scale is assumed to be engraved on the upper part of the ring $c^2$. In the room formed by the projecting margin $c^1$ of the ring $c$ is a magnetic needle $d$ which is rotatable centrically with the horizontal pitch circle about a point $d^1$ fixed on the pillar $b$. The two ends of the magnetic needle $d$ reach closely to the division ring $c^2$ and their upper boundary surfaces lie in the same plane as the upper surface of the ring $c^2$, containing the scale. On the base plate $a$ is further fixed, coaxially with the pillar $b$, a bushing $e$ which forms the guide for the parts rotatable about the vertical axis of the instrument. Inside the bushing $e$ there is rotatably supported, but secured against an axial displacement, a second bushing $f$ which at its top end turns into a plate $f^1$ of somewhat larger diameter than that of the disc $c$. On the margin of the plate $f^1$ is supported by means of a cylindrical extension $g^1$, extending downwardly and embracing the disc $c$, a disc $g$ which surrounds a hollow space containing the magnetic needle and the horizontal pitch circle. The disc $g$ has in its middle an aperture covered up by a glass plate $h$ which admits of also easily showing from outside the position of the magnetic needle at any one time. On either side of this middle aperture are disposed two bearing pedestals $g^2$ and $g^3$ which together with the disc $g$ consist of a single piece. The left-hand bearing pedestal $g^2$ carries, rigidly connected thereto, a bush $i$ which towards the centre of the instrument projects beyond the lateral edge of the pedestal $g^2$. On the projecting end of this bush $i$ rests a cylindrical body $l$ which is supported in the right-hand pedestal $g^3$ by means of another cylindrical body $k$. The body $l$ serves for the reception of the telescope and is rotatable about the horizontal titlting axis fixed by the bearing pedestals $g^2$ and $g^3$. The telescope itself is not shown in the drawing; it may be executed in an optional, well-known way, whereby it must be seen to, however, that its tube has in its middle part an aperture on each side so that the rays coming through the bush $i$ can enter into the body $k$. The left-hand part of the cross piece $k$ is rigidly connected to a disc $m$ containing in its somewhat oblique margin a ring $m^1$. The latter carries a height circle; the scale is assumed to be engraved on the free front surface of the ring $m^1$. Opposite the disc $m$ there is disposed a second disc $n$ which is rigidly connected to the pedestal $g^2$ and embraces by means of a cylindrical extension $n^1$ the margin of the disc $m$, thereby enclosing a space serving for the reception of the reading device of the height circle. The reading ocular common to both circles is disposed on the right-hand side of the instrument in the extension of the tilting axis. On the pedestal $g^3$ is fixed a sleeve $o$, into the right-hand end of which there is inserted a stationary divided plate $p$. Behind the latter is disposed a reflecting prism $q$, which deflects the incoming rays in the direction of the observer and transmits them to an ocular $r$. A casing $q^1$, carrying the reflecting prism $q$, is fixed together with the ocular $r$ on the sleeve $o$ in such a way as to be rotatable about the tilting axis of the instrument through 180° so that, even with the telescope being completely turned over about its horizontal axis, the observer is in a position to read off from the same station. The horizontal pitch circle is read off at two places on either side of the observer, which are rendered visible from outside and simultaneously illuminated by a glass window each $g^4$ and $g^5$, inserted into the disc $g$. On the right-hand side the image of the graduation, produced by an objective $s$, is transmitted to the observing ocular by means of a reflecting prism $t$. On the left-hand side an objective system, consisting of two members $u^1$ and $u^2$, furnishes in conjunction with a roof prism $u^3$ the corresponding image of the second reading place, the system $u^1$, $u^2$ being so chosen that the image of the graduation produced has the same magnification as the image of the other reading place. The rays of the image of the left-hand place of the pitch circle also traverse in that case the prism $t$, but only its lower part which simply acts as a plane-parallel plate. The reading of the height circle is taken at the two opposite places of the vertical plane, viz above and below whereby, in a similar way as with the height circle, the respective places of the graduation are illuminated by means of glass windows $n^2$ and $n^3$ in the disc $n$. The rays of the upper place of the pitch circle are reflected by a simple reflecting prism $v$, those of the lower place of the pitch circle by a roof prism $w$ towards the centre of the pitch circle and transmitted to the observing ocular in the direction of the tilting axis by means of a reflecting system, supported in the upper part of the hollow tilting axis and consisting of two uniform prisms $x^1$ and $x^2$. The objective producing the image consists for both places of the circle of two members, one front member each, $v^1$ and $w^1$ respectively being fixed laterally of the disc $n$, whilst a rear member $y$ is common to both places of the circle and is disposed closely behind the reflecting system $x^1$, $x^2$. For both the horizontal pitch circle and the height circle the divided plate $p$ is fitted with a reading graduation each, $p^1$ and $p^2$ respectively, (vide Fig. 3) and, in addition, for both ends of the magnetic needle with a double mark each, $p^3$ and $p^4$ respectively.

If an angle is to be measured with the compass, it is requisite to take two readings on the horizontal pitch circle, the one time when directing the telescope upon the respecting aiming point, the other time when setting the ends of the magnetic needle to the centres of the two double marks $p^3$ and $p^4$. The difference between both readings indicates the compass-angle sought. The image presented in the ocular field with the second directing is shown in Fig. 3.

I claim:

1. The combination of a fundamental body, a pedestal body disposed on the fundamental body rotatably about a vertical axis, a horizontal circle connected with the fundamental body, a part disposed on the pedestal body rotatably about a horizontal axis, this part being adapted to receive a telescope, a magnetic needle, disposed inside the said horizontal circle, and optical means comprising a reading microscope and being adapted to render visible simultaneously the said needle and the horizontal circle at such a position of the said part that a telescope placed within this part would be directed upon approximately the magnetic meridian.

2. The combination of a fundamental body, a pedestal body disposed on the fundamental body rotatably about a vertical axis, a horizontal circle connected with the fundamental body, a part disposed on the pedestal body rotatably about a horizontal axis, this part being adapted to receive a telescope, a magnetic needle disposed inside the said horizontal circle, optical means comprising a reading microscope and being adapted to render visible simultaneously the said needle and the horizontal circle at such a position of the said part that a telscope placed within this part would be directed upon approximately the magnetic meridian, and a fixed mark for the magnetic needle, disposed in the field of view of the said microscope.

3. The combination of a fundamental body, a pedestal body disposed on the fundamental body, rotatably about a vertical axis, a horizontal circle connected with the fundamental body, a part disposed on the pedestal body rotatably about a horizontal axis, this part being adapted to receive a telescope, a vertical circle connected with this part, a magnetic needle disposed inside the said horizontal circle and optical means comprising a reading microscope and being adapted to render visible simultaneously the said needle and both circles at such a position of the said part that a telescope placed within this part would be directed upon approximately the magnetic meridian.

ALBERT KÖNIG.